Patented Nov. 23, 1937

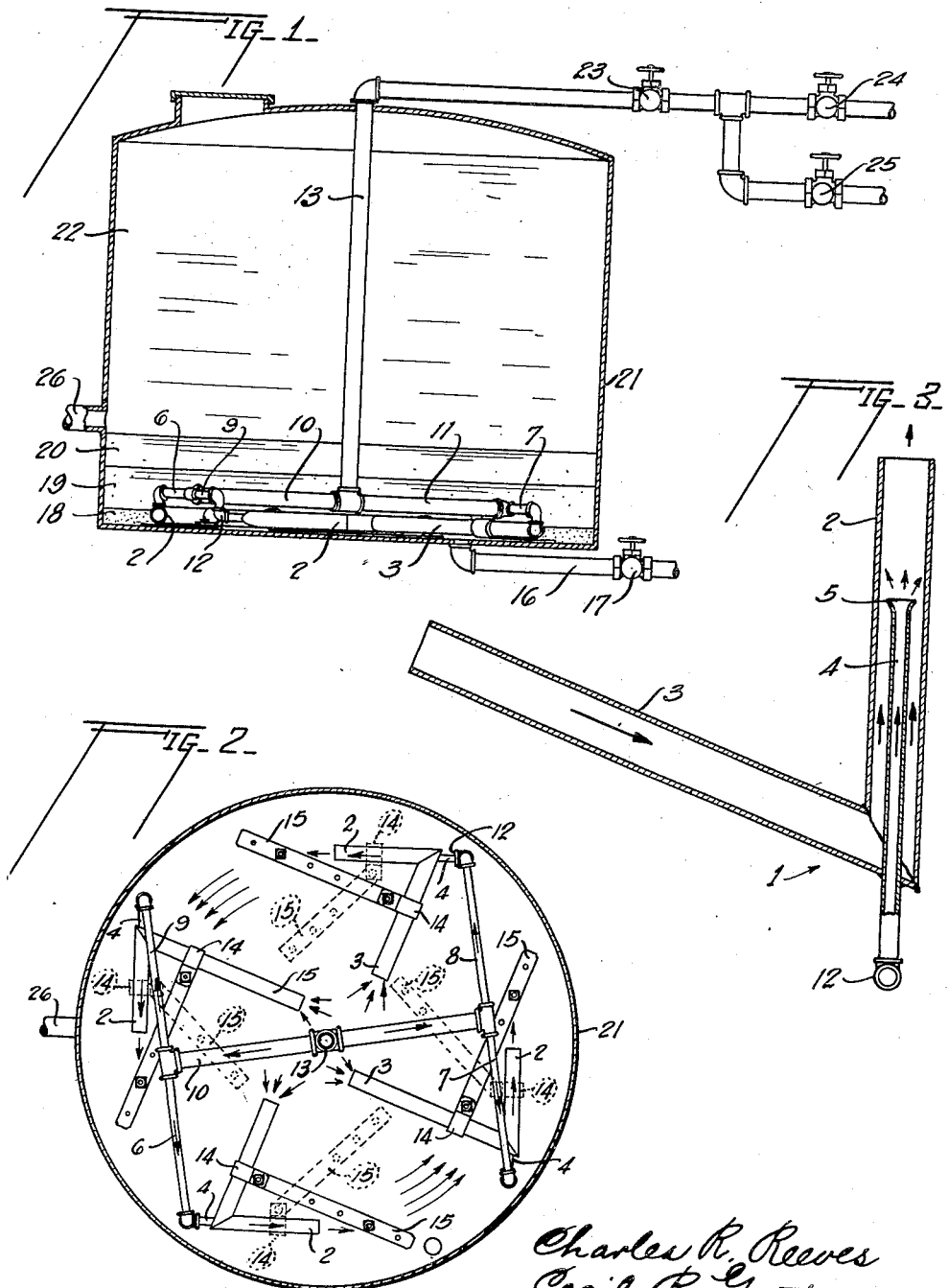

2,099,824

UNITED STATES PATENT OFFICE 2,099,824

APPARATUS FOR PURIFYING OIL

Charles R. Reeves and Cecil R. Gentry, Oklahoma City, Okla.

Application November 30, 1936, Serial No. 113,302

3 Claims. (Cl. 196—46)

Our invention relates to an apparatus as well as a method for treating or purifying oil.

A large percentage of crude oil, as it is produced from the wells, contains various forms of impurities and foreign matter, such as: salt water, sand, rotary mud, fresh water, dirt, and paraffin. Before such oil can be shipped, it must contain not more than 1% (average figure) impurities by weight, and to reduce the impurities in the oil to this small percentage, many different methods and apparatus are used.

The greatest difficulty encountered in purifying the oil to this condition is the variance in grades of oil, and the amount of impurities in the oil from different wells in the same field, or even in wells side by side. The oil from one well may contain 65% salt water, while oil from a near-by well may have very little salt water but a large percentage of sand, rotary mud, or paraffin, while a well between the two might be 97% free of impurities. Oil from such wells, when mixed together, is often very difficult to purify with present methods. At present, treatment with one type apparatus may remove some of the impurities, and the remainder must then be treated with another apparatus, or by another method, and so on until all the impurities possible have been removed. This makes it necessary for each producer to invest in various types of apparatus as well as in tanks for purifying by each method or apparatus, which is very expensive, not only from the standpoint of money spent but of time consumed in purifying, and in loss of oil because of inability to reduce all the oil to the required state of purity for sale.

It is the object of our invention to provide an apparatus which is capable of treating different types of oil in different ways so as to remove their particular type impurities, and which is much more efficient in removing the various types of impurities than present apparatus.

Another object is to provide such an apparatus which, in addition to being used for the purification of oil, may be used to clean sediment from tank bottoms without the necessity of workmen having to enter the tank. At present the tank cleaning operation alone, on a 1,000 or 1,500 bbl. tank, requires at least five men working for approximately 6 to 8 hours, and also requires that a section of the tank be removed.

Another object is to provide a method of treatment which will purify oil which, under present purification methods, is considered waste oil, and is lost by the producer.

Other objects are to provide an apparatus which is capable of heating the oil in large tanks much faster than apparatus now in use; which is capable of raising the temperature throughout the body of oil comparatively evenly; which will impart a rapid rotary motion to a body of liquid in a circular tank and maintain the rotary motion even after the liquid has been heated to a high degree; which will rotate a body of water in a tank much faster than a body of oil thereabove, thereby creating friction between the two liquids; which will rotate the liquid near the center of a tank as well as the liquid at the periphery of a tank; which requires less steam volume to purify the same amount of oil than other known apparatus; which, because of the rapidity with which the temperature of the oil is raised, purifies the oil with less loss of gasoline content than other known methods or apparatus; which will more efficiently wash the oil with hot water than present equipment; which is capable of quickly cooling the oil after it has been heated; which may be used in restoring the gasoline content which may have been lost during the purification process; and which, because of all the above, will purify oil in much less time and much more economically than apparatus now in use.

With these and other objects in view as will more fully appear hereinbelow, our invention consists in the construction, novel features, and combination of parts hereinafter more fully described, pointed out in the claims hereto appended, and illustrated in the accompanying one-sheet drawing, of which, Figure 1 is a side sectional view of a purifying tank equipped with our apparatus;

Fig. 2 is a plan view of one embodiment of apparatus used in connection with our method, showing the apparatus in place in a tank bottom; and, Fig. 3 is a detailed sectional view of the particular type injector which we prefer to use in connection with our method.

Like characters of reference designate like parts in all the figures.

Bear in mind that a large percentage of crude oil as it comes from the well is in the form of an emulsoid, having tiny globules of impurities in suspension, each having a fine film-like outer casing. By analyzation and experiment we have learned that some of these globules are heavier than oil, some lighter, some heavier than water, some lighter, and some are heavier than oil yet lighter than water. Only a small percentage of the tiny impurity globules will settle out of the oil before their outer casings are broken or disintegrated, or their surface tension reduced. Therefore it is necessary to break the outer casing of those globules which will not settle, or cause precipitation by affecting the outer casings in some other manner. The outer casings of some may be broken by mere contact or "bumping together" with other globules; some may be broken by frictional contact with the wall of a tank or with a faster moving body of water; some may be broken by heat alone; some may be broken by both heat and frictional contact; some may be broken or their surface tension reduced by the action of a chemical introduced into the oil; some require both chemical and heat; some require a combination of heat, chemical, frictional contact, and quick temperature change; and some require contact with a physical agent, such as hot water passing through the oil.

Our method consists in placing a small body of water and a comparatively large body of oil in a circular tank; rapidly and uniformly heating the body of oil by heating the body of water therebeneath; rotating the entire body of oil by rapidly rotating the body of water including the liquid near the center of the tank as well as the liquid near the periphery, and thus creating friction between the impurity globules and the sides of the tank, and between the impurity globules and the faster rotating body of water; admixing a suitable chemical with the oil to further aid in breaking down the outer casings of the impuritiy globules, or in reducing their surface tension sufficiently to cause them to settle out of the oil, washing the oil with hot water, which simply means letting the water, as it passes downward through the oil, physically contact and carry downward many of the impurity globules; cooling the oil quickly to prevent undue loss of gasoline content, and at the same time resorting the partially lost gasoline content by the passing of cold wet gas through the oil; allowing the impurities to settle to the bottom of the oil or into the water therebeneath; again rapidly rotating the body of water beneath the oil to cause the impurities at the bottom of the oil to pass on downward into the body of water; again allowing the impurities to settle; and finally drawing off the water and impurities from beneath the oil.

One apparatus for making it possible to treat oil in the above manner is shown in the accompanying drawing and will now be described.

A plurality of steam injectors, designated as a whole by numeral 1, are positioned in the bottom of a cylindrical purifying tank 21 with their discharge portions 2 pointing at a tangent to the sides of the tank 21, as shown clearly in Fig. 2. The feeder portions 3 of the injectors 1 are rigidly secured to the discharge portions 2 at an angle of about 60°–65°, and their intake ends extends to points short of the center of the tank, and also at a tangent to the wall of the tank. The feeder portions 3 are of different lengths so that the suction of liquid into each one helps whirl or rotate the liquid near the center of the tank. The steam jet 4 has a flared end 5 to cause the steam emited to spread out and completely fill the outer end of the discharge portion 2 adjacent the flared end 5, thus creating a high degree of vacuum back of the end 5 and through the feeder portion 3. As seen in Fig. 3 the jet 4 passes through the wall of the feeder portion 3 adjacent the point where it connects with the discharge portion 2.

Pipes 6, 7, 8, 9, 10, and 11, connected together in a suitable manner as shown in Fig. 2, are connected to the elbows 12 on the outer ends of the steam jets 4, and communicate with a supply pipe 13 which may pass down through the center of the tank or may enter the tank at any preferred point. If the supply pipe 13 enters through a side wall of the tank, it is obvious that a check valve would have to be used to prevent the liquid in the tank from passng out of the tank through the supply pipe 13 while not in use. This is mere expediency and therefore has not been illustrated. A control valve 23, or valves 24 and 25, are provided to control the supply passing through pipe 13.

Clamps 14 encircle either the feeder portions 3, or the discharge portions 2 (as shown by the dotted lines), or both, and are attached to one end of straps 15, the other ends of which are securely bolted to the bottom of the tank, or otherwise anchored. These straps and clamps serve to adjustably but firmly anchor the injectors 1 in the position desired, and to prevent recoil movement as steam is emitted from the jets. We call attention to the fact that we contemplate adjusting the position of either the discharge nozzles 2, the feeder pipes 3 or the entire injector, both with relation to each other and with relation to the bottom and side walls of the tank.

A suitable waste drain pipe 16 communicates with the interior of the tank bottom and is provided with a suitable valve 17. This pipe serves to draw off the body 18 of settled impurities and the body 19 of water, as well as the body 20 of impurities which are lighter than water yet heavier than oil. The body 22 of oil is not drawn off through the pipe 16, but through a drain pipe 26 through the side wall of the tank, its lower wall spaced approximately 12 to 14 inches above the tank bottom. Oil is not drained from the tank until the top surface of the body 20 of impurities is at least 4 to 6 inches below the lower wall of the oil drain pipe 26. This is a regulation enforced by the purchaser of the oil.

*Operation*

The valves 23 and 24 are opened and steam under high pressure passes through the pipes 13, 10, 11, 6, 7, 8, and 9 and through the jets 4 and out the discharge nozzles 2. The jets 4, being flared at their delivery ends, cause the steam to spread out and completely fill the space in the nozzle adjacent the discharge ends of the steam jets. The rapid outward passage of the steam creates a high degree of vacuum in the feeders 3, sucking the cooler liquid from a point adjacent the center of the tank into and through the feeders 3 and discharge portions 2, and discharging it with force at a tangent to the sides of the tank. A solid stream of liquid is therefore emitted from each nozzle. Heating of the liquid is also hastened by the circulation of the water over and around the hot steam pipes 6, 7, 8, 9, 10, and 11 in the bottom of the tank. These alone are much more effective in heating the liquid than the old steam coil method because of the greater circulation induced by our apparatus. Were a mere jet of steam discharged, it would, while the water remains comparatively cold, impart a rotary motion to the water in the tank. As the water neared the boiling point, however, the force of the steam would be of no practical value in continuing the rotary motion of the liquid, or in maintaining even heat beneath the body of oil because the steam would condense within one to three feet after it left the nozzle. The solid stream of liquid utilized in our method does not lose its force as does a jet of steam. The liquid as it passes through the injector is heated by contact with the jets 4 and by contact with the steam emitting from the jets. In fact, with our device the entire volume of liquid in a 1,000 bbl. tank can be raised to a temperature of 185° within a period of three hours and ten minutes, with 110 lbs. steam pressure; whereas, the period required by the steam jet heating method is approximately 5½ to 8 hours, with approximately 110 lbs. steam pressure; and the period required by the hot steam coil method is approximately 8 to 11 hours.

Preferably this heating and rotating step is continued until the temperature of the entire body of oil is above the boiling point of the low boiling hydrocarbon fraction in the oil, such as paraffin, and the like.

There is no other method or apparatus known at present which actually rotates or whirls the body of oil in a 1,000 or 1,550 bbl. tank, and which will heat the oil uniformly and effectively. The mere heating and rotating, as just described, is sufficient to break down the globules of impurities in many types of oil and to cause them to be released from suspension.

The next step in our process or method involves the introduction of a selected demulsifying agent such as Tret-O-Lite, De Hydro, or Vez and the thorough mixing of this chemical throughout the oil. The action of such agent is to reduce the surface tension of the film-like outer casings of the impurity globules. It is akin to the action of soap chips or soda ash on water globules. In case the heating of the oil has not entirely succeeded in causing the low boiling constituents to separate or break away from the outer casings of the globules a different type demulsifying agent such as aluminum chips and caustic soda, or sulphuric acid and bicarbonate of soda is introduced.

In order to thoroughly mix the demulsifying agent with the oil, the valve 24 is closed and the valve 25 opened, introducing cold "wet gas" (natural gas with high gasoline content) into the body of water 19. This wet gas is forced through the apparatus at low pressure. At this point in the process the oil and water in the tank are hot, and both are rotating. The "wet gas", being lighter than either of the liquids, rises through the liquids causing a thorough agitation, thus thoroughly mixing the water, oil, and demulsifying agent. The water carried up, being heavier than the oil, passes back down through the oil when the gas is turned off, and carries with it, by physical contact, many of the impurity globules. It has been proven by actual test, during this step, that an 8 inch body of water at the bottom of the tank can be reduced to 2 inches within 20 minutes, the other six inches of water being distributed throughout the oil. The fact that the oil is rotating also aids in thoroughly admixing the gas, the water, and the demulsifying agent with the body of oil. Also since the gas is at a comparatively low temperature it acts not only to cool the oil, thereby reducing the total time at which the oil is at a temperature which causes loss of gasoline content, but also acts to deposit a portion of its gasoline content in the oil, thus replacing the gasoline content which the oil may already have lost due to vaporization at the higher temperature.

After this agitation by the wet gas has been continued approximately 30 minutes the valve 25 is closed and the liquid allowed to come to a rest.

The action of the demulsifying agent in breaking down the outer casings of the impurity globules, the friction between the globules and the sides of the tank, and between the globules and the faster moving body of water, and the physical contact of the impurity globules with the upward and downward traveling water globules, all combined, will cause a very large percentage of the impurities to settle to the bottom of the oil, many passing on through the water to the tank bottom, forming the layer of impurities 18.

After the impurities have settled the valve 24 is again opened and steam under high pressure is again discharged into the water for approximately 20 minutes. The resultant rapid rotation of the body of water beneath the bodies of oil 22 and suspended impurities 20, creates a high degree of friction between the water and the impurities 20, thereby causing a large percentage of these suspended impurities to be broken down and to pass into the water, leaving the oil substantially free of impurities. Tests taken before and after this step show that a layer of suspended impurities 20 approximately 14 inches in thickness can be reduced to a layer only 2 to 3 inches in thickness in a period of approximately 20 minutes.

We point out that this last step does not again mix the impurities into the oil. The oil is not agitated or rotated, since it takes some little time for a rotary motion to be imparted to the oil by the water, and the tendency is for the water to suck or draw the suspended impurities downward into the water. Also a much greater degree of heat friction is now applied to the globules, since they are congregated in close proximity to the hot water. If found desirable, especially in case the already settled layer of impurities 18 is comparatively deep, we contemplate raising our injectors 1 in a horizontal plane off the bottom of the tank. This would further aid in preventing the possibility of again mixing any of the impurities with the oil.

After this step, the steam is turned off, and the impurities again allowed to settle, after which the impurity layers 18 and 20 together with the water 19 are drained from the tank through the pipe 16, leaving only purified oil in the tank ready for shipment.

Regarding the efficiency of our apparatus in actually imparting a rotary motion to the liquid in the tank, we call particular attention to the manner in which the inner ends of the feeder pipes 3 are eccentrically grouped about the center of the tank. Each feeder picks up liquid near the center, but off center sufficiently in the direction of whirl to assist greatly in rotating and heating the liquid in the center of the tank. The fact that our apparatus actually imparts a rotary motion to, and heats, the entire body of water explains the reason why we are able to heat the oil uniformly, and at the same time impart a rotary motion to the entire body of oil.

In using our apparatus for cleaning tanks a relatively small amount of water is run into the tank, the valve 24 is opened and steam under high pressure passes into the sediment and water, rotating both at high speed and causing the sediment and impurities to be suspended in the rotating liquid. The valve 17 may then be opened and the sediment leaves the tank with the water through the pipe 16. The heat created by the steam melts the paraffin and other petroleum impurities and thus thoroughly cleans the tank bottom. The process may be repeated if desired, or if necessary.

The particular apparatus shown in our drawings is not an absolute necessity in treating oil by our method. The rotation of the liquid might be accomplished by utilizing centrifugal pumps, driven by steam turbines, and using the steam exhaust from the turbines to heat the oil in the bottom of the tank. The heating of the water and oil could also be accomplished by turning steam into the tank or by placing steam coils in the tank.

Our apparatus, howeved, greatly facilitates the purifying of oil by this method and is of course preferable to the last mentioned apparatus.

Having thus described our invention, what is claimed and desired to be secured by Letters Patent, is:

1. An apparatus for treating oil comprising a cylindrical container having a closure; a plurality of injectors adjustably secured adjacent the container bottom, each being so positioned that its discharge end discharges along the side wall of the container and its intake end intakes near the center of the container; and a plurality of feeder pipes connecting the injectors to a controlled source of supply.

2. An apparatus for treating oil comprising a substantially cylindrical container; a plurality of injectors within the container, each having a discharge and an intake portion connected together at an angle, and each so positioned with relation to the others and with relation to the container wall that their discharge imparts a rotary motion to the outer portion of a liquid in said container and their intake imparts a like rotary motion to the central portion of said liquid; means for adjustably positioning the injectors within the container; and a corresponding plurality of feeder pipes for connecting said injectors to a source of supply.

3. In an apparatus for purifying oil, the combination with a cylindrical container having an inlet, a bottom outlet, and a side wall outlet, of: a plurality of substantially L-shaped injectors adjustably secured inside the container in such position that their discharge ends discharge at a slight angle to the side wall of the container in the same relative direction around the inside of the container, and their intake ends intake adjacent to, and in the same relative direction around, the center of the container; and pipes for connecting the injectors to a common source of supply.

CHARLES R. REEVES.
CECIL R. GENTRY.